No. 753,118. PATENTED FEB. 23, 1904.
C. H. BURTON.
STEAM COOKER.
APPLICATION FILED JULY 3, 1903.
NO MODEL. 2 SHEETS—SHEET 2.
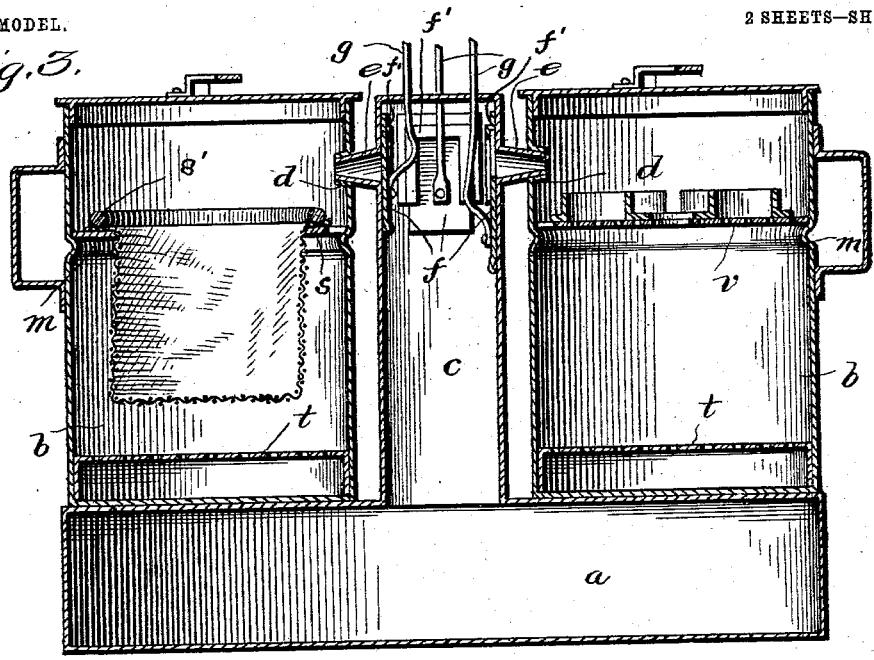
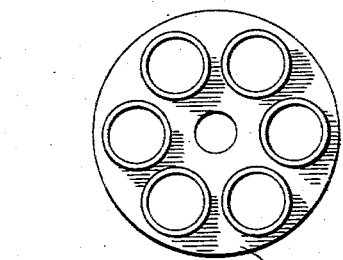
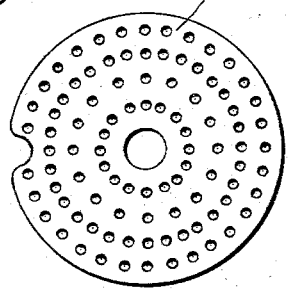
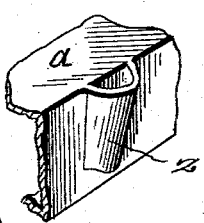
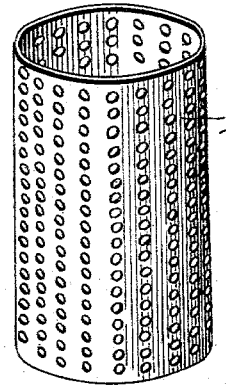
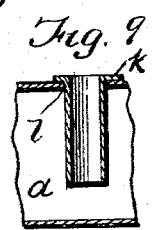
Witnesses
R. A. Boswell
George M. Anderson
Inventor
C. H. Burton
By E. W. Anderson
his Attorney
THE NORRIS PETERS CO., PHOTO-LITHO., WASHINGTON, D. C.

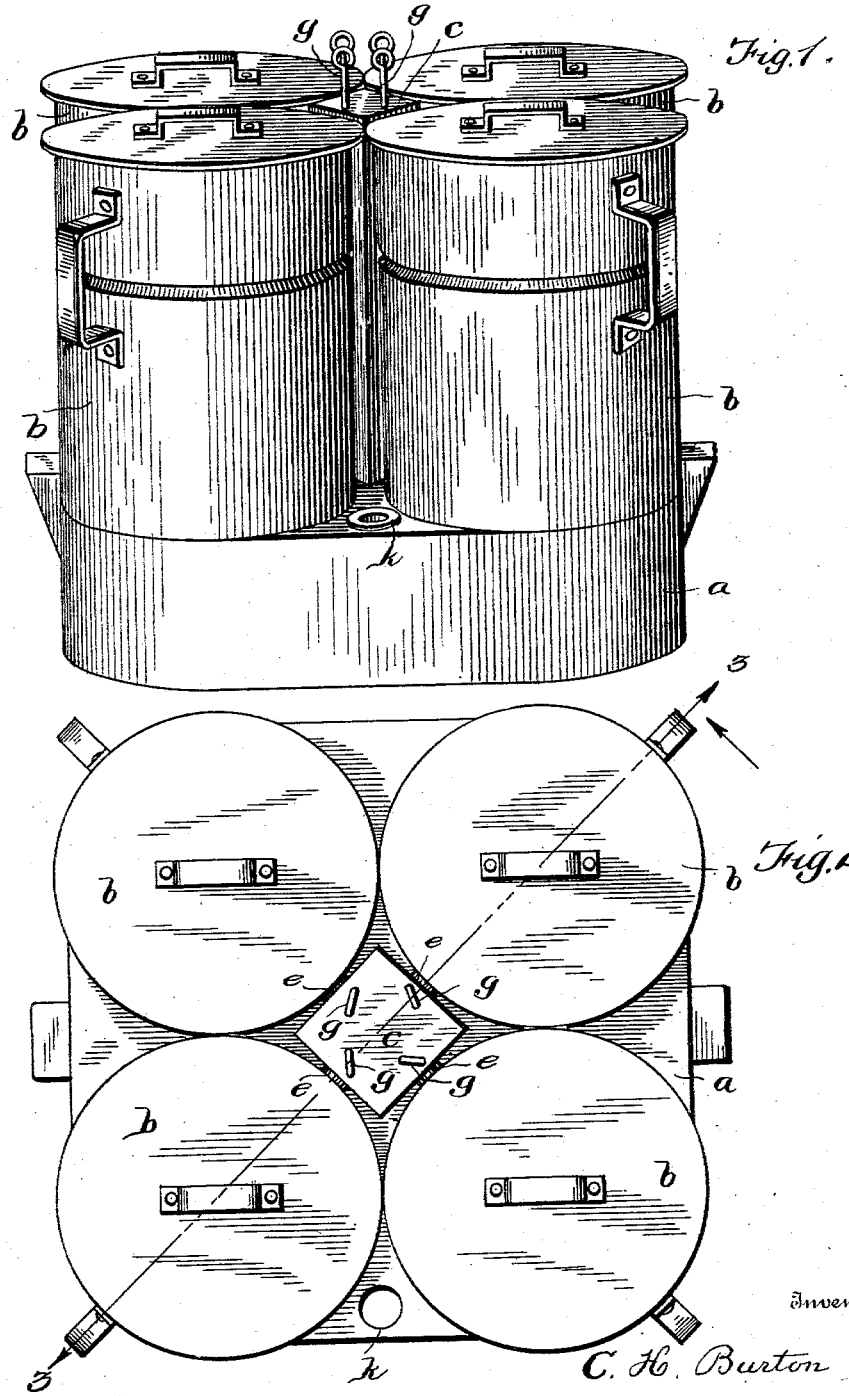

No. 753,118. Patented February 23, 1904.

UNITED STATES PATENT OFFICE.

CLINTON H. BURTON, OF ST. LOUIS, MISSOURI.

STEAM-COOKER.

SPECIFICATION forming part of Letters Patent No. 753,118, dated February 23, 1904.

Application filed July 3, 1903. Serial No. 164,223. (No model.)

*To all whom it may concern:*

Be it known that I, CLINTON H. BURTON, a citizen of the United States, and a resident of St. Louis, in the State of Missouri, have made a certain new and useful Invention in Steam-Cookers; and I declare the following to be a full, clear, and exact description of the same, such as will enable others skilled in the art to which it appertains to make and use the invention, reference being had to the accompanying drawings, and to letters of reference marked thereon, which form a part of this specification.

Figure 1 is a perspective view of the invention. Fig. 2 is a top plan view of the same. Fig. 3 is a section on the line 3 3, Fig. 2. Figs. 4 to 9, inclusive, are detail views.

The invention has relation to steam cooking apparatus; and it consists in the novel construction and combinations of devices, as hereinafter set forth.

In the accompanying drawings, illustrating the invention, the letter $a$ designates the water-reservoir or boiler-base, which is of sufficient horizontal spread to provide for the reception of several steamers or cooking vessels $b$, adapted to be arranged upon the platform-top of the reservoir around a central upward-projecting steam chamber or dome $c$. This steam-dome is usually of quadrilateral or other prismatic form, according to the number of steaming vessels for which it is adapted. These vessels are designed to rest upon the flat upper surface of the reservoir close to the dome, and each is provided with a conical inlet-nipple $d$, alined with and adapted to engage a conical nipple $e$ of its respective side of the steam-dome. Each face of the steam-dome is provided with a radial nipple $e$, exposed to sight and within the dome, with a vertically-reciprocatory cut-off valve or gate $f$, having an operating-rod $g$, which projects through and above the top of the steam-dome. The cut-off valve shown is a slide-plate, and it is arranged in a slideway $f'$. The rod $g$ may be bent a little in order to provide a frictional stop to hold the valve in position when adjusted. The steam from the steam-dome is designed to pass through the nipples into the steamer or cooking vessel, and the amount of steam introduced into the vessel may be readily controlled by the adjustment of the cut-off valve.

The reservoir and the steaming vessels or pots should be provided with suitable handles. A filling well or tube $h$ is provided in the reservoir. This is usually made with a marginal flange at its upper end to rest on the top of the reservoir around the reception-aperture $l$. This well is designed to be removable, so that the reservoir can be readily emptied of its water and sediment when desirable. The well should reach nearly to the bottom of the reservoir. Sometimes an extension-well may be used, as indicated at $z$.

In this cooking apparatus each cooking vessel uses fresh steam, and as no one of the utensils communicates with another there is no liability of the contents of any vessel being affected by vapors or odors from the other vessels or steamers, each of which is designed, of course, to be provided with a cover. It is also desirable that each steamer be provided with a perforated false bottom $t$, whereby the contents can be protected from such water and waste matters as may condense or fall through said false bottom. Each steamer should also be formed with an interior shoulder or ledge $m$ around its wall near its upper end for the support of different utensils or appliances required in cooking special articles. An annular shelf $s$ may be placed thereon to hold a coffee-bag, which rests thereon, by means of a wire ring $s'$, with which its mouth is provided, said ring being of larger diameter than the opening in the shelf. A perforated shelf $v$ may be placed thereon to hold small vessels for cooking eggs and other small articles. A perforated vessel $p$ may be used within the steamer on the false bottom for cooking rice.

This apparatus is designed to afford convenient and satisfactory results in cooking by steam. There is no way in which odors or flavors can be communicated from one steamer to another. The vessels are capable of independent inspection and are independent in operation. When one steamer has finished its cooking, the steam can be cut off therefrom either partially or wholly, as may be desired, while the vessel may remain in position on the boiler-reservoir to keep its contents warm or may be removed therefrom for serving or cooling.

The nipples of the steam-dome and steamers being located near the top of the latter the steam enters directly in the upper portion of the vessel, and usually above the ledge $m$, for better action in cooking such articles as may be placed upon the shelf resting on said ledge.

Having described this invention, what I claim, and desire to secure by Letters Patent, is—

In a steam-cooker, the combination with a base-reservoir having a central upwardly-projecting steam-dome provided with radial conical laterally-projecting nipples on the sides thereof, said reservoir having a flat upper surface, of a plurality of cooking vessels adapted to rest upon said upper surface and having lateral openings in their side walls in alinement with the nipples of said dome, and valves controlling the openings of said nipples and grouped at the upper portion of said dome, substantially as specified.

In testimony whereof I affix my signature in presence of two witnesses.

CLINTON H. BURTON.

Witnesses:
   JNO. M. MORAN,
   HARRY A. JOSTARND.